(12) United States Patent
Schabinger

(10) Patent No.: US 8,443,788 B2
(45) Date of Patent: May 21, 2013

(54) INTERNAL COMBUSTION ENGINE

(76) Inventor: Gunter W. Schabinger, Pforzheim (DE)

( * ) Notice: Subject to any disclaimer, the term of this patent is extended or adjusted under 35 U.S.C. 154(b) by 452 days.

(21) Appl. No.: 12/065,880

(22) PCT Filed: Sep. 1, 2006

(86) PCT No.: PCT/EP2006/008543
§ 371 (c)(1),
(2), (4) Date: Mar. 5, 2008

(87) PCT Pub. No.: WO2007/028545
PCT Pub. Date: Mar. 15, 2007

(65) Prior Publication Data
US 2008/0236521 A1    Oct. 2, 2008

(30) Foreign Application Priority Data
Sep. 5, 2005 (DE) .......................... 10 2005 041 992

(51) Int. Cl.
*F02B 33/00* (2006.01)
(52) U.S. Cl.
USPC .......... 123/559.1; 123/1 A; 123/68; 123/79 R
(58) Field of Classification Search
USPC .................. 123/559.1, 560, 68, 79 R, 1 A
See application file for complete search history.

(56) References Cited

U.S. PATENT DOCUMENTS

| | | | |
|---|---|---|---|
| 1,510,651 A * | 10/1924 | Burtnett ........................ 123/79 R |
| 1,513,677 A * | 10/1924 | Smith ............................ 123/531 |
| 1,555,454 A | 9/1925 | Bugatti |
| 2,170,818 A * | 8/1939 | Hanson ......................... 123/257 |
| 2,392,060 A * | 1/1946 | Osborn ........................ 123/79 R |
| 2,453,377 A * | 11/1948 | Lozivit .......................... 123/432 |
| 4,106,445 A | 8/1978 | Beveridge |
| 4,202,300 A * | 5/1980 | Skay ............................. 123/432 |
| 4,476,821 A * | 10/1984 | Robinson et al. ............... 123/68 |
| 4,625,684 A * | 12/1986 | Van Avermaete ........... 123/48 A |
| 4,643,156 A * | 2/1987 | Schatz .......................... 123/560 |
| 4,709,683 A * | 12/1987 | Schatz .......................... 123/560 |
| 5,228,415 A * | 7/1993 | Williams .................... 123/51 R |
| 5,694,891 A * | 12/1997 | Liebich ........................... 123/68 |
| 5,785,015 A * | 7/1998 | Philippe et al. ............. 123/70 R |
| 6,276,138 B1 * | 8/2001 | Welch ............................. 60/602 |

(Continued)

FOREIGN PATENT DOCUMENTS

| | | |
|---|---|---|
| CH | 539 198 | 8/1970 |
| DE | 27 46 022 | 4/1979 |

(Continued)

OTHER PUBLICATIONS

JP 2008529516 Office Action dated Dec. 15, 2010.

(Continued)

*Primary Examiner* — Thomas Denion
*Assistant Examiner* — Patrick Maines
(74) *Attorney, Agent, or Firm* — Cantor Colburn LLP

(57) ABSTRACT

An internal combustion engine is charged by a compressor such that for example only a fraction of the charge is supercharged for an operating cycle of the internal combustion engine and is supplied via a separate charging channel with the help of a short-stroke valve which is controlled by the camshaft after closure of the inlet of the internal combustion engine such that the suction/charging stroke of the four-stroke process is maintained entirely or partially.

19 Claims, 4 Drawing Sheets

U.S. PATENT DOCUMENTS

| | | | |
|---|---|---|---|
| 6,295,965 B1 * | 10/2001 | Firey | 123/250 |
| 6,418,916 B1 * | 7/2002 | Newmann et al. | 123/572 |
| 6,698,405 B2 * | 3/2004 | Bigi | 123/560 |
| 7,017,533 B2 * | 3/2006 | Hamey | 123/48 D |
| 2003/0183211 A1 * | 10/2003 | Bigi | 123/560 |

FOREIGN PATENT DOCUMENTS

| | | |
|---|---|---|
| GB | 1 549 969 | 7/1976 |
| JP | 56-139828 | 3/1955 |
| JP | 56-142225 | 3/1955 |
| JP | 56-147313 | 4/1955 |
| JP | 56 110517 | 9/1981 |
| JP | 60-187331 | 12/1985 |
| JP | 07 042564 | 2/1995 |
| JP | 07 208174 | 8/1995 |
| JP | 2001 020745 | 1/2001 |
| JP | 2002303144 A | 10/2002 |
| WO | 02/20958 | 3/2002 |
| WO | 02/084089 | 10/2002 |

OTHER PUBLICATIONS

International Search Report; PCT/EP2006/008543; Nov. 23, 2006.
JP Decision of Rejection 2008-529516 dated May 24, 2011.
JP Office Action 2008-529516 dated Dec. 15, 2010.
JP Decision on Appeal 2008-529526 dated Sep. 3, 2012, with English Transl.

* cited by examiner

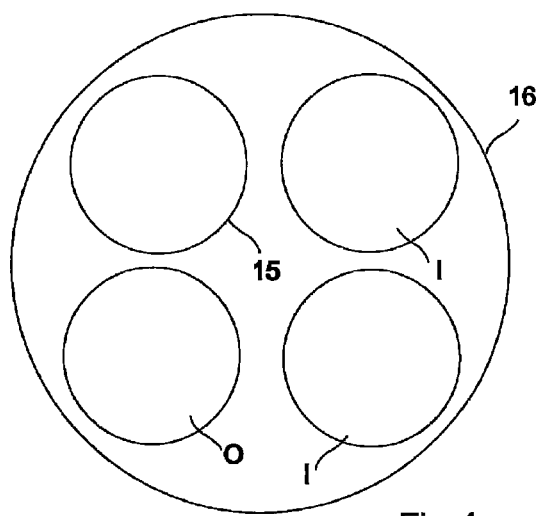
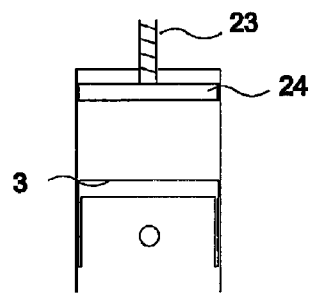
Fig.4
Fig.6
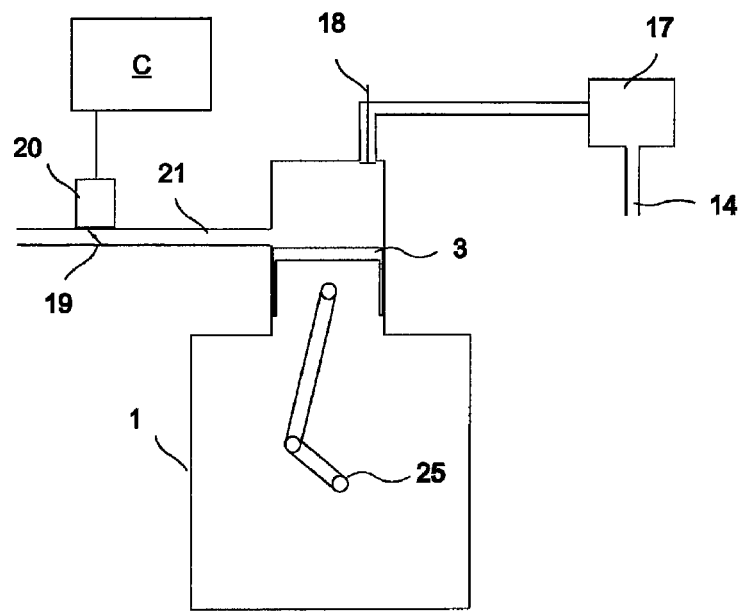
Fig. 5

US 8,443,788 B2

INTERNAL COMBUSTION ENGINE

CROSS REFERENCE TO RELATED APPLICATIONS

The present application claims the priority of the German Patent Application 10 2005 041 992.5, filed on Sep. 5, 2005, the entire disclosure of which is hereby incorporated by reference in its entirety. Additionally, this application is the national phase (35 U.S.C. 371) of International Patent Application No. PCT/EP2006/008543 filed on 1 Sep. 2006.

TECHNICAL FIELD OF THE INVENTION

The invention relates to a four-stroke internal combustion engine which is charged by a small-capacity compressor. In this connection, small-capacity compressor means that the cylinder capacity thereof has a smaller dimension than the single-cylinder capacity of the internal combustion engine.

BRIEF DESCRIPTION OF RELATED ART

Whilst superchargers are state of the art in car engines in the high-performance field, the high revolution speed concept is preferred in the two-wheeled sector for reasons of the conveying characteristic and production costs.

An internal combustion engine with an inlet channel which is pilot-controlled by a membrane valve is already known from WO 02/20958 A1, into which inlet channel a charging channel controlled by a spring-loaded valve discharges. The cylinder head of the internal combustion engine has an inlet valve.

WO 02/084089 A1 shows an internal combustion engine which is charged by a compressor. The compressor and the internal combustion engine are connected directly by a charging channel. During charging, the cylinder capacity of the compressor has therefore a larger dimension than the cylinder capacity of the internal combustion engine. This type of construction leads to larger oscillating compressor masses than with a small-capacity compressor.

DE 27 46 022 A1 shows a multi-cylinder four-stroke internal combustion engine with supercharger, a crank-controlled small-capacity compressor conveying air through separately disposed charging channels. The charging channels are not controlled separately.

An internal combustion engine with a crank-controlled compressor is known from U.S. Pat. No. 5,785,015 A. It is used in a two-stroke internal combustion engine to form a mixture and has no primary charging function.

CH 539 198 A shows a charged internal combustion engine with slide control. The arrangement has no primary charging function.

U.S. Pat. No. 4,106,445 A shows an internal combustion engine with an additional piston-controlled inlet. The controlling piston has no primary charging function.

GB 1 549 969 A discloses an internal combustion engine with a very small piston in the cylinder head. It has no primary charging function.

In U.S. Pat. No. 6,295,965 B1 an internal combustion engine with an inlet channel and an outlet channel is shown. Further channels of the internal combustion engine are piston valve-controlled.

U.S. Pat. No. 1,555,454 discloses an internal combustion engine with an additional piston- and valve arrangement. The system has no primary charging function.

BRIEF SUMMARY OF THE INVENTION

Starting from this state of the art, the invention produces a four-stroke internal combustion engine which is charged by a small-capacity compressor and is capable of high revolution speeds.

A spring-loaded piston system which is controlled by the camshaft of the internal combustion engine forms the oscillating element of a small-capacity compressor. The cylinder capacity of the small-capacity compressor comprises for example a fifth of the stroke volume of the internal combustion engine. The internal combustion engine is charged by the compressor such that for example only a fraction of the charge is supercharged for an operating cycle of the internal combustion engine and is supplied via a separate charging channel with the help of a short-stroke valve which is controlled by the camshaft after closure of the inlet of the internal combustion engine. The conventional inlet path of an internal combustion engine is thereby maintained. The compressor with its separately controlled charging channel has a good conveying characteristic with high efficiency. The proposed charging system contributes to improved formation of the mixture as a result of turbulence during the charging process. As a consequence, a favourable effect on the combustion and the untreated emissions can be assumed.

The piston system has the arrangement of a stroke valve as model. The light metal piston takes the place of the valve plate. The valve shaft of a stroke valve is complemented by an oval rotary safety device, the valve spring, the fittings thereof and possibly the cupped tappets are retained.

Preferably, the inlet of the small-capacity compressor is piston valve-controlled. The inlet of the internal combustion engine is controlled by two or three inlet valves, a short-stroke valve respectively controlling the charging channel.

As a function of the cylinder capacity of the small-capacity compressor and the oscillating masses, a crank-controlled piston can be provided. The drive of the small-capacity compressor is thereby effected preferably in combination with the camshaft and at an identical revolution speed.

In order not to disturb, in this type of embodiment, the suction process due to a superimposed flow from the charging channel, a spring-loaded valve is provided in the cylinder head of the small-capacity compressor. This valve initiates the charging process at the correct stroke. Thereafter, the cam-controlled, short-stroke charging valve in the cylinder head of the internal combustion engine opens. The crankcase ventilation of the engine is effected via the small-capacity compressor in this type of construction.

In multi-cylinder engines, the revolution speed of the small-capacity compressor is increased at the correct stroke.

Competitive characteristic values in
  specific output,
  torque,
  efficiency,
  untreated emissions and
  cost per kilowatt,
can be expected with the proposed engine.

The small-capacity compressor can hence represent an promotionally effective, unique feature for a high-power engine.

BRIEF DESCRIPTION OF THE FIGURES

In the following, the invention is explained with reference to an embodiment which is represented in the annexed Figures. There are shown.

DETAILED DESCRIPTION OF THE INVENTION

The invention is now explained by way of example with reference to the annexed drawings. However the embodiments involve only examples which are not intended to restrict the inventive concept to a specific arrangement.

Before the invention is described in detail, reference is made to the fact that it is not restricted to the respective components of the internal combustion engine and to the respective method steps since these components and methods can vary. The terms used here are only intended to describe particular embodiments and are not used in a restrictive manner. If in addition in the description or in the claims, singular or indefinite articles are used, this also relates to the plurality of these elements as long as the entire context does not make something else unequivocally clear.

Figure 1:
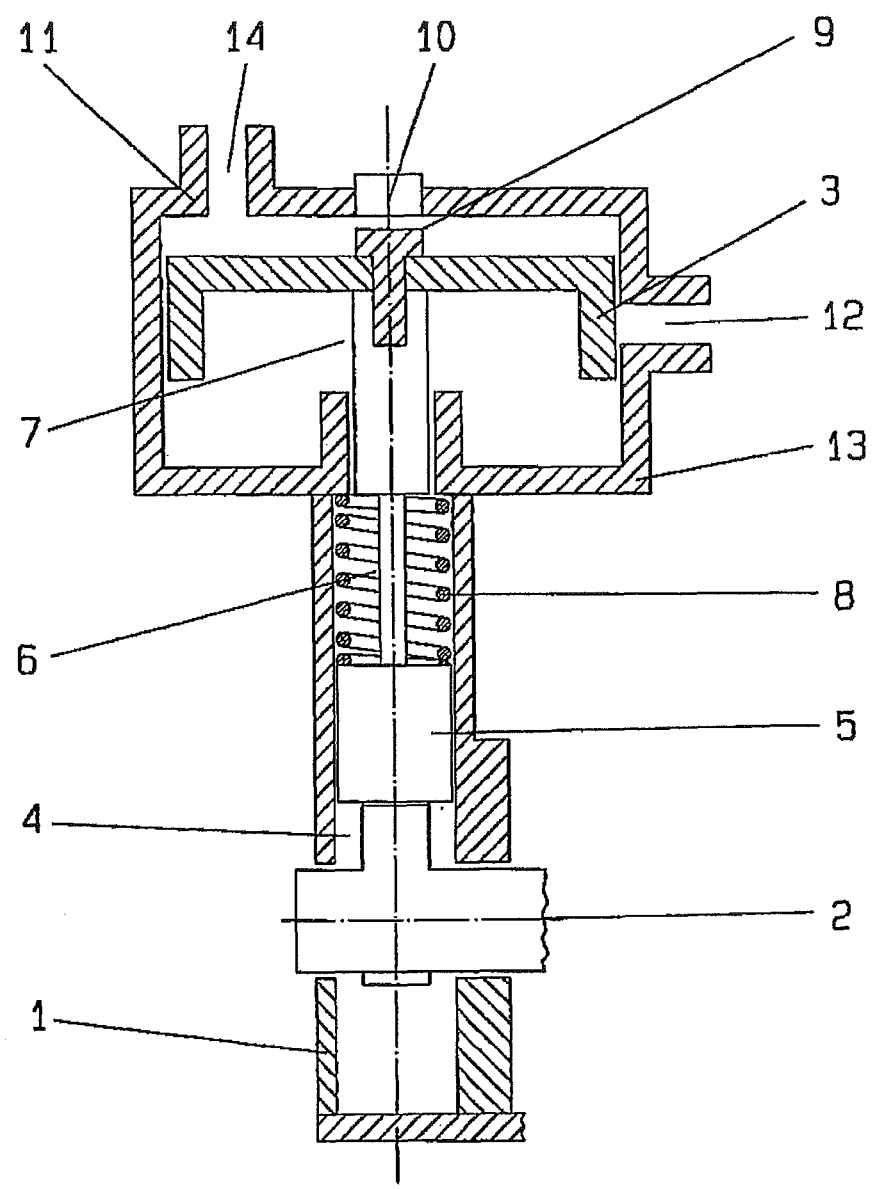
FIG. 1 a longitudinal section of the small-capacity compressor which is integrated in the cylinder head of the internal combustion engine, FIG. 2 a longitudinal section through a part of a cylinder head of an internal combustion engine with a separate inlet channel and a short-stroke inlet valve, FIG. 3 a common arrangement of FIGS. 1 and 2 relative to each other, by way of example, without complete charging channel, FIG. 4 a top view of a cylinder head, FIG. 5 a longitudinal section of a controlled alternative of the small-capacity compressor, and FIG. 6 A longitudinal section of a compressor piston in the compressor cylinder wherein a variable geometry is provided.

FIG. 1 shows the compressor housing 1 and the camshaft 2 of the internal combustion engine for controlling the compressor piston 3. In the known manner, it has a compression ring (not illustrated) and an oil control ring (not illustrated). The piston 3 is actuated with the help of the cam 4, the cupped tappet 5, the piston shaft 6, its oval rotary safety device 7 and the spring 8. The compressor piston 3 and the rotary safety device 7 are connected by a shake-proof screw connection 9. For protection of the piston system at excess revolution speeds, a stop 10 is provided in the cylinder head 11 of the compressor.

The inlet of the compressor is effected via inlet borings 12 in the compressor cylinder 13. The outlet is effected via the charging channel 14.

The four-stroke internal combustion engine has at least one cylinder with a cylinder head 16 and also at least one camshaft 2 and is operated in the known manner with a pressure circulation lubrication and possibly a supercharger. A small-capacity compressor represented in FIG. 1 conveys air into the internal combustion engine and cooperates with a cam-controlled charging valve 15 at the correct stroke. At least one charging channel 14 which is separated from other inlet channels is controlled by the short-stroke charging valve 15 which is disposed in the cylinder head 16 of the internal combustion engine after closure of the inlet so that the suction/charging stroke of the four-stroke process can be maintained entirely or partially.

Figure 2:
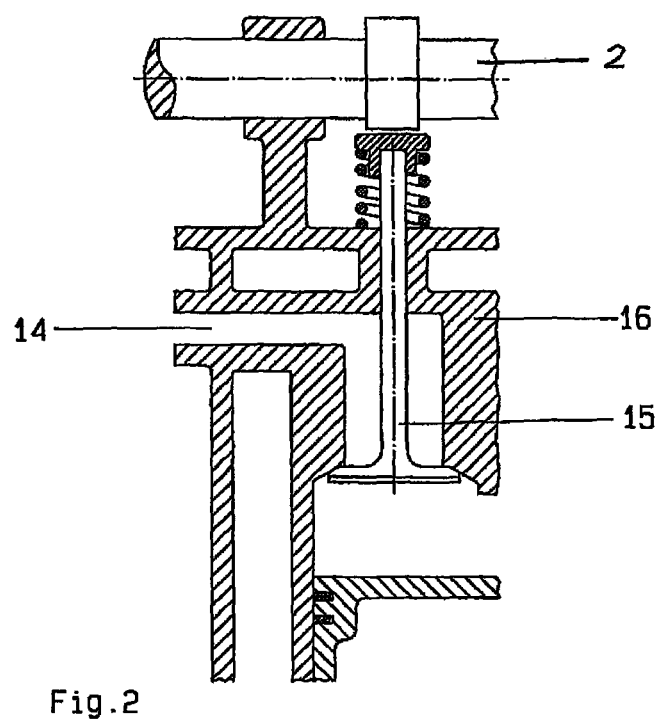

The illustrated embodiment operates as follows:

The internal combustion engine according to FIG. 2 and the compressor suction in the charging air via their inlet channels, controlled by the throttle valves (not illustrated). The throttle valves can be electronically linked. The transition from the suction region into the charging region is thereby effected by the electronically controlled throttle valve of the compressor (not illustrated).

Preferably, the inlet of the small-capacity compressor is piston valve-controlled. The inlet of the internal combustion engine is controlled by two or three inlet valves, a short-stroke valve respectively controlling the charging channel 14.

In the inlet channel of the internal combustion engine, for example a low pressure injection is provided.

The compressor suctions in a small quantity of charging air relative to the internal combustion engine via the inlet borings 12, compresses it in the compressor cylinder 13 and supplies it via the charging channel 14 and a short-stroke, separate inlet valve 15 to the internal combustion engine. The initiated operating cycle continues in the known manner.

The above-described embodiment relates to an engine with small oscillating masses. Its cam-controlled small-capacity compressor can cooperate directly, i.e. without an additional valve in the cylinder head 11 of the small-capacity compressor, at the correct stroke with the internal combustion engine and is therefore suitable in particular for small engines.

In the case of larger cylinder capacities, as a function of the cylinder capacity of the small-capacity compressor and the oscillating masses, a crank-controlled compressor is provided. An e.g. single-cylinder internal combustion engine then has a preferably spring-loaded valve in the cylinder head 11 of the compressor for pilot control of the charging air. A cam control of this valve is not required. However other possibilities for actuation of this valve are also known to the person skilled in the art. The drive of the small-capacity compressor is thereby effected preferably in combination with the camshaft and preferably at an identical revolution speed, other revolution speeds also being possible and/or possibly being necessary.

In order in this embodiment not to disturb the suction process by means of a superimposed flow from the charging channel, a spring-loaded valve is provided in the cylinder head of the small-capacity compressor. This valve initiates the charging process at the correct stroke. Thereafter, the cam-controlled, short-stroke charging valve 15 in the cylinder head 16 of the internal combustion engine opens. The crankcase ventilation of the engine is effected via the small-capacity compressor in this type of construction.

A multi-cylinder internal combustion engine can be charged by a single-cylinder or multi-cylinder compressor. In this case, a revolution speed adaptation/revolution speed increase at the correct stroke is required. The pilot control of the charging air is then effected via valves in the cylinder head 11 of the compressor. These valves are actuated at the correct stroke by the camshaft of the internal combustion engine or by cams which are provided on rotating engine parts of the compressor and they can also be spring-loaded. Other possibilities are also known to the person skilled in the art as to how he can actuate these valves as required according to the invention.

In the case of the described constructions, the present charging system contributes to improved formation of the mixture by forming turbulence during the charging process. As a consequence, a favourable effect on the combustion and untreated emissions can be assumed.

The crankcase of the internal combustion engine can be ventilated both via the inlet channel of the internal combustion engine and via the inlet channel of the compressor.

By way of simplification, the crank-controlled compressor and the internal combustion engine can have a common belt- or chain drive. They can also have a common crankshaft. Instead of a reciprocating compressor, also other compressor/supercharger constructions can be provided.

The respective types of embodiments, as a function of the quantity of charging air, can be represented with or without charging air cooler. A diesel engine can thereby have a substantially larger compressor volume than a comparable Otto engine, dependent upon the type of construction. In this context, reference may also be made to the fact that the compressor can have a variable geometry.

For the purpose of mass balancing, the small-capacity compressor can in addition be actuated via a toothed wheel-driven shaft which is situated parallel to the crankshaft.

At the beginning of the description, the process was termed four-stroke process. Upon close consideration, a different picture emerges because of the present embodiments.

The engine has a suction, charging, compression, operating and exhaust stroke. Strictly speaking, the charging stroke is hence a recharging stroke. In contrast hereto, the suction stroke is replaced by the charging stroke in the case of conventional charging.

The conventional charging process can be applied if necessary in addition to the above-described process.

Referring to FIGS. 4-6, the functions and elements discussed above our further clarified. FIG. 4 shows a top view on the cylinder head 16 with short-stroke charging valve 15 and inlet valves I and outlet valve O (the spark plug being omitted).

Figure 3:
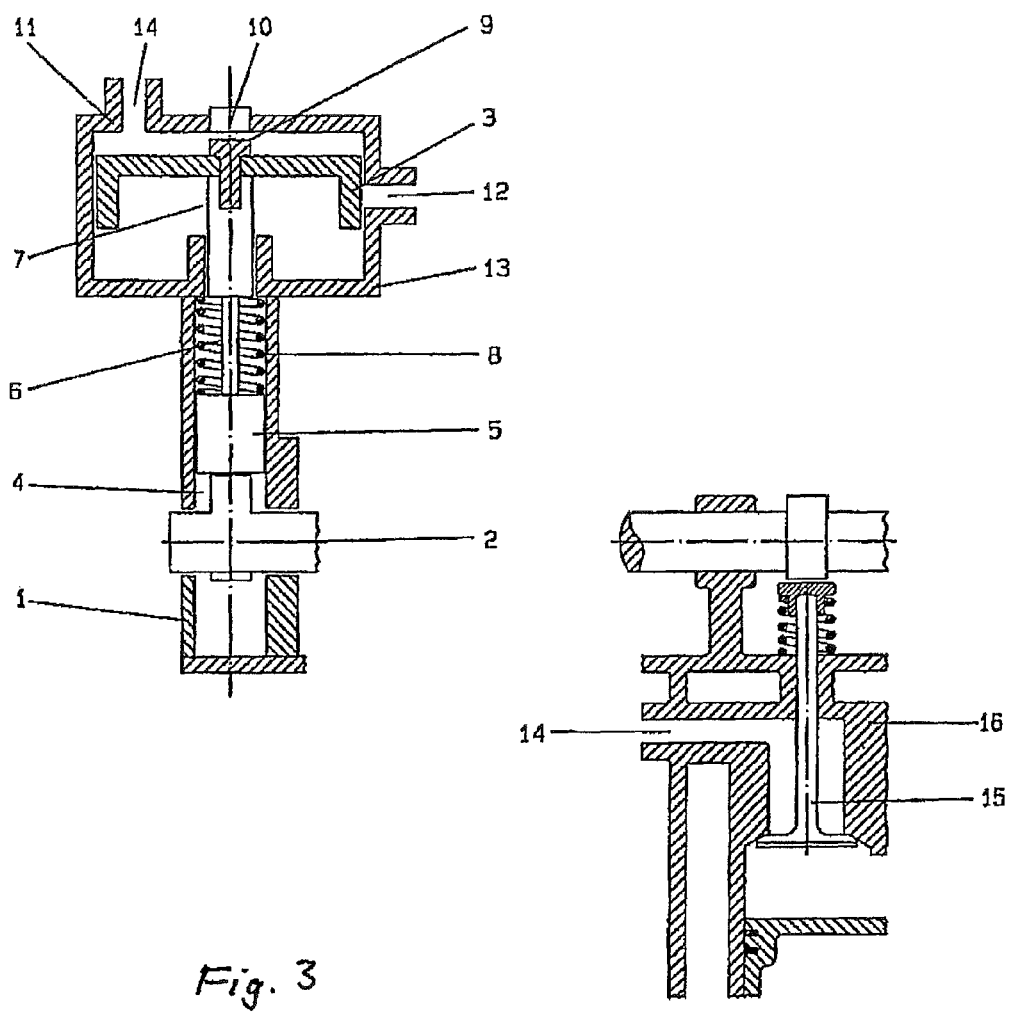

FIG. 5 shows the crank controlled alternative of the small-capacity compressor. In the casing 1 is the crank 25 of the compressor piston 3 which is in operative connection with the crank of the operating cylinder for example via non-illustrated pinions. A throttle valve 19 is arranged in the compressor inlet channel 2, and engaged by an actuator 20 that is controlled by control C. This shows the linkage of claim 25. A pilot valve 18 can be arranged at the outlet channel 26. The outlet channel conveys the charged air to a charged air cooler 17. The cooled air is then supplied to the operating cylinder via charging channel 14 (see FIGS. 1 to 3).

FIG. 6 shows the compressor piston 3 in the compressor cylinder wherein a variable geometry is provided. An adjustable and variable element 24 is arranged opposite to the piston 3 in the cylinder chamber. The position of the adjustable element 24 can be adjusted by element 23, which is a spindle in this exemplary embodiment.

It is obvious that this description can be subjected to the most varied of modifications, amendments and adaptations which act as equivalents to the dependent claims.

The invention claimed is:

1. A four-stroke internal combustion engine comprising:
    at least one cylinder with a cylinder head and at least one camshaft,
    a pressure circulation lubrication,
    a small-capacity compressor configured to charge air, the small capacity compressor comprising a cylinder capacity having a smaller dimension than a single-cylinder capacity of the internal combustion engine, such that only a fraction of a charge of the single cylinder capacity is additionally supercharged for an operating cycle of the internal combustion engine, and the small capacity compressor also comprising at least one cylinder with an associated piston and an associated cylinder head, the small-capacity compressor conveying air and cooperating with at least one short-stroke re-charging valve,
    at least one inlet channels each including an inlet valve and at least one re-charging channel each including said at least one short-stroke re-charging valve, the at least one re-charging channel and the at least one short-stroke re-charging valve arranged at each of the at least one re-charging channels being separate from other inlet channels of the at least one inlet channels and controlled at a correct stroke and with respect to re-charging air by said at least one short-stroke re-charging valve after inlet closure of the other inlet channels of the internal combustion engine such that the suction/charging stroke of the four-stroke process is maintained entirely or partially, the at least one short-stroke re-charging valve being also disposed in the cylinder head of the internal combustion engine,
    wherein the at least one short-stroke re-charging valve and the piston of the small-capacity compressor are either cam-controlled and operating at the speed of the camshaft for re-charging at the correct stroke of the at least one cylinder of the internal combustion engine, or the at least one short-stroke re-charging valve is cam-controlled and the small-capacity compressor is crank-controlled and operating at the speed of the camshaft or at an increased speed relative to the speed of the camshaft at the correct stroke for re-charging at the correct stroke of the at least one cylinder of the internal combustion engine, wherein the small-capacity compressor that is crank controlled includes at least one a pilot control valve for re-charging at the correct stroke.

2. The four-stroke internal combustion engine according to claim 1, wherein the small-capacity compressor being cam-controlled conveys air, the small-capacity compressor supplying the air to the internal combustion engine with the help of the short-stroke re-charging valve controlled by the camshaft.

3. The four-stroke internal combustion engine according to claim 1, wherein the re-charging channel is disposed between the small-capacity compressor being cam-controlled and the internal combustion engine without a spring-loaded valve in the cylinder head of the small-capacity compressor.

4. The four-stroke internal combustion engine according to claim 1, wherein the small-capacity compressor has a spring-loaded valve for pilot control of the charge and supplies the air to the internal combustion engine with the help of the short-stroke re-charging valve which is controlled by the camshaft, the re-charging channel being disposed between the small-capacity compressor and the internal combustion engine.

5. The four-stroke internal combustion engine according to claim 1, wherein the internal combustion engine has a plurality of cylinders, the small-capacity compressor being crank-controlled and having at least one cylinder with associated cylinder head conveying air, valves which are controlled at the correct stroke for the pilot control of the charge being provided in the small-capacity compressor for supplying the air into the internal combustion engine, the re-charging channels being controlled by short-stroke re-charging valves.

6. The four-stroke internal combustion engine according to claim 5, wherein the charging valves are disposed in the cylinder head of the internal combustion engine and are controlled by the camshaft.

7. The four-stroke internal combustion engine according to claim 1, wherein a charging flow which is effected by the small-capacity compressor and guided via the re-charging channel being separate and valve-controlled initiates a turbulence formation which is caused by a quantity of charging air in a sense of an improved formation of a mixture and a favourable effect on combustion and untreated emissions.

8. The four-stroke internal combustion engine according to claim 1, wherein a rotary safety device is provided on a piston shaft of the small-capacity compressor.

9. The four-stroke internal combustion engine according to claim 1, wherein the cylinder head of the small-capacity compressor has a stop.

10. The four-stroke internal combustion engine according to claim 1, wherein crankcase ventilation is effected via the small-capacity compressor.

11. The four-stroke internal combustion engine according to claim 1, wherein the small-capacity compressor and the camshaft of the internal combustion engine are driven in common.

12. The four-stroke internal combustion engine according to claim 1, wherein the small-capacity compressor is one of a reciprocating compressor or a compressor of another compressor/supercharger construction.

13. The four-stroke internal combustion engine according to claim 1, wherein a diesel engine includes the small-capacity compressor with an equal or larger compressor volume than a small-capacity compressor of a comparable Otto engine.

14. The four-stroke internal combustion engine according to claim 1, further comprising a mass-balancing shaft which is situated parallel to the crankshaft for driving the small-capacity compressor.

15. The four-stroke internal combustion engine according to claim 1, wherein a supercharger is provided.

16. The four-stroke internal combustion engine according to claim 1, wherein electronically linked throttle valves are provided in the internal combustion engine and in the small-capacity compressor.

17. The four-stroke internal combustion engine according to claim 1, wherein the small-capacity compressor has a variable geometry.

18. The four-stroke internal combustion engine according to claim 1, wherein two or three inlet valves for controlling the inlet of the internal combustion engine are provided, a short-stroke valve respectively being provided for controlling the charging channel.

19. The four-stroke internal combustion engine according to claim 1, further comprising a charging air cooler.

* * * * *